United States Patent [11] 3,628,384

| [72] | Inventor | Trevor O. Jones |
| | | Milwaukee, Wis. |
| [21] | Appl. No. | 36,280 |
| [22] | Filed | May 11, 1970 |
| [45] | Patented | Dec. 21, 1971 |
| [73] | Assignee | General Motors Corporation |
| | | Detroit, Mich. |

[54] ACCELERATION SENSOR
4 Claims, 4 Drawing Figs.

[52] U.S. Cl. ............................................. 73/514,
200/61.45
[51] Int. Cl. ....................................... G01p 15/02
[50] Field of Search.............................. 73/492,
514, 515, 503; 200/61.45; 116/114 AH; 74/2

[56] References Cited
UNITED STATES PATENTS
3,078,722   2/1963   Kongelbeck.................  73/503
3,296,870   1/1967   Turnblade et al............  73/504

Primary Examiner—James J. Gill
Attorneys—W. E. Finken and Herbert Furman

ABSTRACT: A multidirectional sensor having an operator mounted within a guide tube and spring biased in one axial direction for movement from a first position to a second actuated position. The operator is constrained against movement by the engagement of a plurality of balls mounted within apertures in the wall of the guide tube with a shoulder of the operator. The balls are held against movement outwardly of the guide tube apertures by an internal annular wall of an annular pendulous seismic mass mounted on the guide tube for movement axially and rotationally thereof. The axis of the guide tube, the axis of pendulosity of the mass, and the axis of the mass are coaxial. This wall is interrupted by a plurality of equally spaced axial grooves and the balls normally engage the wall intermediate the grooves. Spring seats on spaced annular walls of the mass and a common stop on the sensor housing are engageable by opposing threshold springs to locate the mass against movement axially of the guide tube. One of the springs torsionally engages the mass to locate the mass against movement rotationally of the guide tube. The sensor can be externally reset when the operator is in actuated position.

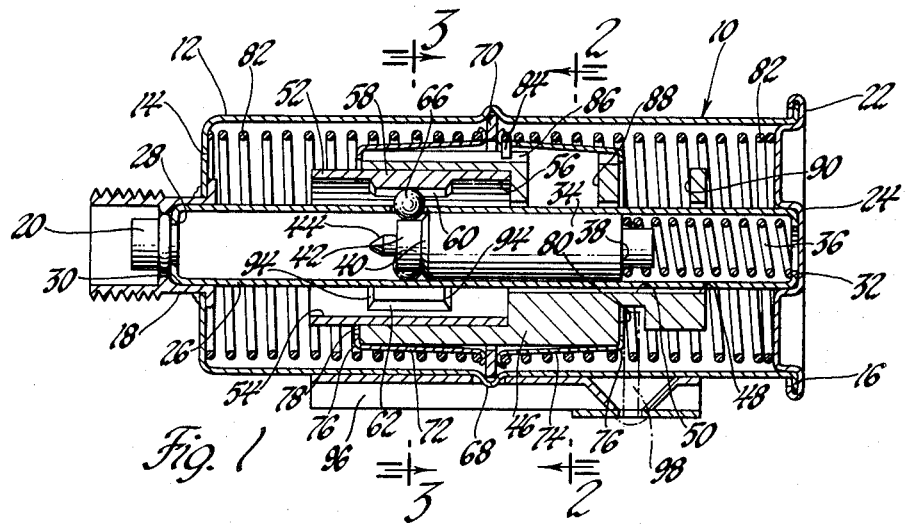
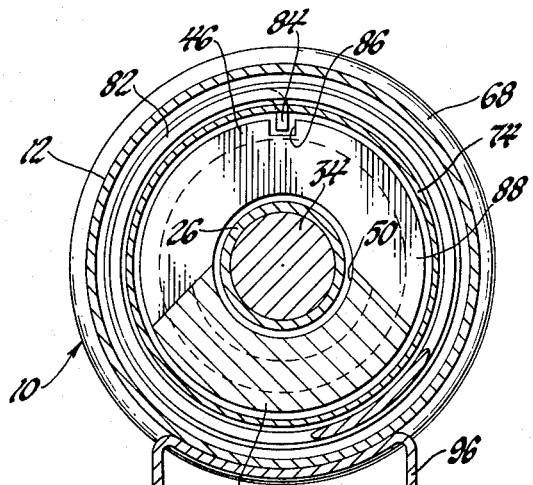
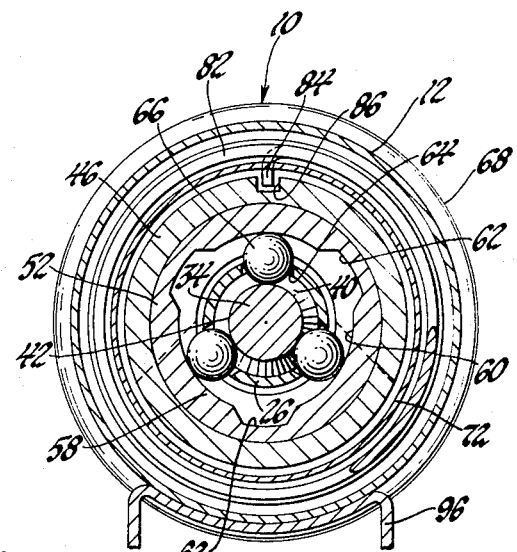
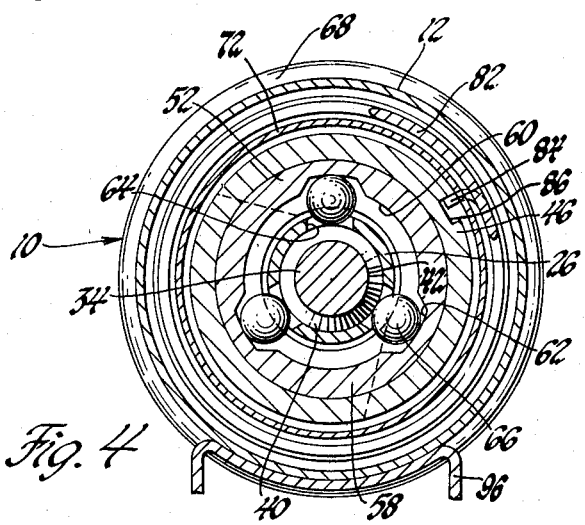
INVENTOR.
Trevor O. Jones
BY
Herbert Furman
ATTORNEY

ACCELERATION SENSOR

This invention relates to directional sensors and more particularly to such sensors which will sense acceleration pulses generally along a predetermined axis and generally laterally of such axis and release an operator such as a firing pin, when an acceleration pulse of predetermined amplitude and time is received by the sensor.

The sensor of this invention is similar in certain respects to that disclosed and claimed in copending application A-13,924, Ser. No. 32,090, filed Apr. 27, 1970, Otakar P. Prachar, and assigned to the assignee of this invention. However, it differs from that shown in the aforenoted application in that it includes a pendulous seismic mass which is bodily movable axially of a predetermined axis of pendulosity and is also rotational about such axis for releasing a detent which normally constrains an operator against biased movement from normal to actuated position.

In a preferred embodiment of the invention, the operator is constrained against spring-biased movement axially of an elongated guide by a plurality of balls which are axially located by respective apertures in the guide and engage both a shoulder of the operator and an internal annular wall of a pendulous seismic mass. The mass surrounds the guide and the axis of pendulosity of the mass is coaxial with that of the guide. The mass is both bodily movable axially of the guide axis and rotational about such axis when subjected to an appropriately directed acceleration pulse sufficient to overcome the bias of threshold springs resisting movement of the mass relative to the axis of pendulosity. The internal annular wall of the mass is interrupted by equally spaced axial grooves, and the balls normally engage the wall intermediate the grooves. The linear distances between the tangential plane of engagement of the balls and the planes of the axial ends of the internal annular wall provide axial integrating distances for acceleration pulses received generally axially of the guide and of the mass. The arcuate distance between the tangential points of engagement of the balls with the internal annular wall and the sidewalls of the grooves on each side thereof provides a rotational integrating distance for acceleration pulses received generally normal or laterally to the axis of the guide and of the mass. Thus, the seismic mass must move relative to its axis of pendulosity either through an axial or a rotational integrating distance before the balls move outwardly of the guide apertures and release the operator for movement to actuated position.

The mass includes an uninterrupted annular wall located to each side of the interrupted annular wall. The uninterrupted annular walls are radially spaced from the surface of the guide a distance slightly less than the spherical diameter of the balls. When the seismic mass moves axially and releases the operator, the balls are constrained against movement out of their respective apertures by the outer surface of the operator and one of the uninterrupted annular walls. This allows reset of the sensor by merely forcing the operator against its biasing spring from actuated position to normal position. When the seismic mass moves rotationally to release the operator, the balls are constrained against movement out of their respective apertures by the outer surface of the operator and the base walls of the grooves. This allows resetting of the sensor by moving the operator against its biasing spring from actuated to normal position and moving the seismic mass rotationally about its axis.

One object of this invention is to provide an improved sensor having a pendulous seismic mass for sensing acceleration pulses applied either generally axially of the axis of pendulosity of the mass or generally normal to such axis and releasing an operator for movement from a normal position to an actuated position when a pulse of predetermined amplitude and time is received. Another object of this invention is to provide such a sensor which can be reset without disassembly. A further object of this invention is to provide such a sensor wherein the operator is held against movement by a plurality of balls engageable with both the seismic mass and the operator and releasable from engagement with the operator upon either axial or rotational movement of the seismic mass through predetermined integrating distances relative to the axis of pendulosity.

These and other objects of this invention will be readily apparent from the following specification and drawings wherein:

FIG. 1 is a sectional view of a sensor according to this invention with the operator being shown in a normal or unactuated position;

FIG. 2 is an enlarged sectional view taken generally along the plane indicated by line 2—2 of FIG. 1;

FIG. 3 is a sectional view taken generally along the plane indicated by line 3—3 of FIG. 1; and FIG. 4 is an enlarged sectional view similar to FIG. 3 and showing the operator being released for movement to an actuated position.

As shown in FIG. 1 of the drawings, a sensor 10 according to this invention includes an outer cylindrical housing 12 having an integral apertured end wall 14 at one end thereof and an outwardly extending flange 16 at the other end thereof. A flanged bushing 18 extends outwardly of the apertured end wall 14 and is suitably secured thereto. The bushing 18 mounts a detonator 20 which is fired when the sensor is actuated as will be further described. A cap 22 is hem flanged to the flange 16 and includes a central axially extending embossment 24.

A cylindrical guide tube 26 has one flanged apertured end 28 thereof engaging an internal annular rib 30 of bushing 18 and the other flanged apertured end thereof seated within the embossment 24 to thereby fixedly locate the guide tube 26 axially of the housing 12. An operator 34 is slidably mounted within the guide tube 26 for movement axially thereof. The operator 34 is biased toward an actuated position or to the left as viewed in FIG. 1 by a coil compression spring 36 which seats between the flanged end 32 of the guide tube and an annular shoulder 38 of the operator. The operator further includes a radially and axially extending annular shoulder 40 which merges into an annular shoulder 42 having extending therefrom a firing pin 44 which is engageable with the detonator 20 through the aperture in the end wall 28 of the guide tube 26 when the operator moves to actuated position.

An annular pendulous seismic mass 46 surrounds the guide tube. The axes of the mass and tube are coaxial. An internal annular rib 48 which extends radially from the axial bore 50 of the mass adjacent one end thereof slidably engages the outer surface of the guide tube 26 to slidably mount the one end of the mass on the guide tube for movement both axially and rotationally of the tube. The mass further includes an insert sleeve 52 which is provided with internal annular walls 54 and 56 of equal axial extent and separated by a radially projecting land 58 which defines an internal annular wall 60. As shown in FIGS. 3 and 4, the wall 60 is interrupted by three equally circumferentially spaced axially extending grooves 62, the base walls of which are extensions of the walls 54 and 56 and the sidewalls of which extend radially and axially with respect to the base walls and wall 60. As best shown in FIG. 3, the guide tube 26 includes three equally circumferentially spaced apertures 64, each of which freely receives a ball 66. The balls normally engage the wall 60 and the radial shoulder 40 of the operator 34 when the seismic mass is in its normal position shown in FIGS. 1 and 3 to thereby hold the operator against movement from the first or unactuated position shown therein to a second or actuated position, previously described.

The housing 12 is provided with a radially outwardly extending annular rib 68 intermediate the ends thereof which retains a split ring 70 in place. Spring seats 72 and 74 each have one radially inwardly flanged end 76 seating on respective radial shoulders 78 and 80 of the seismic mass and the other radially outwardly flanged ends thereof engaging opposite sides of the ring 70. Coil compression threshold spring 82 respectively seat between the end wall 14 and the other flanged end of seat 72, and between the cap 22 and the other flanged end of seat 74 to thereby normally locate the seismic mass 46 axially of the guide tube 26 as shown in FIG. 1 and resist movement thereof in either direction along the guide tube axis. The right-hand spring 82 has an end extension 84 which extends radially inwardly through a slot or aperture in the spring seat 74 and is received within an axial groove 86 in the seismic mass to thereby function as a threshold torsion spring as well as a threshold compression spring and normally locate the seismic mass 46 circumferentially of the guide tube 26 as shown in FIG. 1 and resist rotational movement in either direction about the guide tube axis. As shown in FIG. 1 and 2, the seismic mass is provided with axially spaced partial annular grooves 88 and 90 to provide the seismic mass with pendulosity about its axis and that of the guide tube. Thus, both gravity and the right-hand spring 82 function to normally rotationally locate the mass about the axis of the guide tube in the position shown in FIG. 1. Although both annular grooves are shown as being aligned axially of the mass, they need not be so if desired. The pendulosity of the mass 46 may be increased or decreased by the extent of the grooves 88 and 90 or by providing additional weight radially of the axis of pendulosity on the outer surface of the now cutaway portion 92 thereof intermediate the radial end walls of the groove.

The sensor 10 is shown in unactuated position in FIGS. 1 through 3. Should the mass 46 receive an acceleration pulse of predetermined amplitude and time generally axially thereof, the mass 46 will bodily shift axially of the guide tube, either to the right or to the left, depending on the pulse direction, through an axial integrating distance and against the compressive force of one of the threshold springs 82. As soon as either of the walls 54 or 56 comes into overlying relationship with the balls 66, the radial shoulder 40 of the operator will cam the balls outwardly of the openings 64 in the guide tube 26 to release the operator 34 for movement to the left to actuated position.

When the mass 46 moves axially of the guide tube 26 to release the operator 34, the balls 66 will move radially outwardly of the apertures 64 and the balls will then be trapped between either wall 54 or wall 56 and the outer surface of the operator 34. The balls will thus be retained within the apertures 64 of the guide tube 26 and cannot escape either radially or axially of the apertures. The balls will also engage either of the interrupted radial shoulders 94 between wall 60 and walls 54 and 56 to retain the seismic mass 46 in its bodily shifted position against the action of either of the springs 82 which happens to be compressed. The pendulosity of the mass 46 and gravity will normally constrain the mass against rotational movement as it moves axially of the tube 26 under an acceleration pulse directed generally axially of such tube. The groove 86 and the end 84 of the right-hand spring 82 guide movement of the seismic mass when the mass moves axially to the left and do not apply any axial biasing force or resistance on the mass when it moves axially in either direction under a generally axially directed acceleration pulse.

If it is desired to reset the sensor 10, the operator 34 is moved to the right from its actuated position to its normal or unactuated position by a suitable tool engaging the firing pin 44 through the apertured end wall 28 of the guide tube. As soon as the balls 66 move from the outer surface of the operator 34 and onto the radial shoulder 40, the compressive force of the compressed spring 82 tending to return the seismic mass 46 to its normal axial position and the camming action of the engaged shoulder 94 cooperate to return the balls 66 inwardly of the apertures 64 to reset the sensor and locate the seismic mass 46 in its position shown in FIG. 1.

Should the acceleration pulse be received in a direction generally normal to the axis of the seismic mass 46 or generally normal to the axis of the operator 34, the mass 46 will rotate through a rotational integrating distance about the axis of the guide tube 26 and against the torsional bias of the right-hand spring 82 and gravity. This rotation of the mass 46 will move the balls 66 into the grooves 62 as shown in FIG. 4, and out of engagement with the shoulder 40 to release the operator 34 for movement to actuated position.

The balls 66 will be constrained against movement radially and axially of the apertures 64 by both the base and one sidewall of each of the grooves 62 and the outer surface of the operator 34. In order to reset the sensor 10, the operator 34 is moved from its actuated position to its normal or unactuated position as previously described. As soon as the balls 66 move from the outer surface of the operator and onto the radial shoulder 40, the torsional bias of the right-hand spring 82 will slightly rotate the seismic mass 56 so that the mass will return to its normal position shown in FIG. 1.

The sensor 10 may be provided with a suitable mounting bracket 96 for mounting on a support and any suitable type of safety pin 98 may be provided for engagement within an annular bore or groove of the mass to maintain the mass in a normal or unactuated position regardless of any acceleration pulses applied thereto.

It is believed evident from the foregoing description that the sensor 10 should be mounted on the support with the axis of the guide tube and of the mass located in a plane parallel to the horizontal. Likewise, it is believed evident that an acceleration pulse may be received in a direction such that the mass 46 may tend to both move axially of the guide tube and rotate thereabout. The balls 66 will thereupon be located either in the grooves 62 or in engagement with one of the shoulders 94, depending on the direction and amplitude of the pulse.

The grooves 62 in the specific embodiment shown divide the internal annular wall 60 into three wall portions or pads which are generally rectangular in a cylindrical plane. It should be noted that such pads can be shaped otherwise to provide the desired crash acceleration double integration sensitivity desired. This is accomplished by using other shapes of pads, such as circular pads, hexagonal, elliptical or other.

The sensor 10 of this invention is particularly intended for use with an air cushion restraint system of a vehicle body. The firing of the detonator 20 may in turn fire a suitable transmission element such as a pyrocord which in turn may fire a squib to rupture the diaphragm of a sealed pressure vessel and thereby release the contents of the vessel to inflate the cushion. Likewise the operator 34 may be used to directly rupture the diaphragm of the pressure vessel or may be used to close an electric switch to in turn electrically fire a squib for rupturing the diaphragm.

Thus this invention provides an improved sensor.

I claim:

1. A sensor comprising, in combination, a support, an operator mounted on the support for movement between first and second positions relative thereto, detent means operable to hold the operator in the first position against movement to the second position, a pendulous seismic mass, means mounting the mass on the support for bodily movement along the axis of pendulosity thereof and rotational movement about such axis, and means operably connecting the mass to the detent means to release the detent means from the operator upon either mode of movement of the mass relative to the axis through a predetermined distance.

2. A sensor comprising, in combination, a support, an operator mounted on the support for movement along a predetermined axis between first and second positions relative thereto, detent means operable to hold the operator in the first position against movement to the second position, a pendulous seismic mass, means mounting the mass on the support for bodily movement along the axis of pendulosity thereof and rotational movement about such axis, the axis of pendulosity being coaxial with the axis of movement of the operator, and means operably connecting the mass to the detent means to release the detent means from the operator upon either mode of movement of the mass relative to the axis of pendulosity through a predetermined distance.

3. A sensor comprising, in combination, a support, an operator mounted on the support for movement between first and second positions relative thereto, detent means operable to hold the operator in the first position against movement to the second position, a pendulous seismic mass, means mounting the mass on the support for bodily movement in either direction relative to the axis of pendulosity thereof and rotational movement in either direction relative to such axis, and means operably connecting the mass to the detent means to release the detent means from the operator upon either mode of movement of the mass relative to the axis through a predetermined distance.

4. A sensor comprising, in combination, a support, an operator mounted on the support for movement along a predetermined axis between first and second positions relative thereto, means biasing the operator to the second position thereof, an annular pendulous seismic mass surrounding the operator and including an annular wall facing the operator and provided with a plurality of grooves extending axially of the predetermined axis, means mounting the mass on the support for bodily movement along the axis of pendulosity thereof and rotational movement about such axis, the axis of pendulosity and predetermined axis being coaxial, and a plurality of radially movable balls engageable with the operator and the mass wall for holding the operator against movement to the second position thereof, movement of the mass along the axis of pendulosity moving the mass wall out of engagement with the balls to release the operator, rotational movement of the mass relative to the axis of pendulosity permitting the balls to move radially out of engagement with the operator and into the mass wall grooves to release the operator.

* * * * *